(12) United States Patent
Miyakoshi

(10) Patent No.: US 7,615,333 B2
(45) Date of Patent: Nov. 10, 2009

(54) WRITE-ONCE OPTICAL DISK AND OPTICAL RECORDING METHOD

(75) Inventor: Toshimori Miyakoshi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 441 days.

(21) Appl. No.: 11/557,831

(22) Filed: Nov. 8, 2006

(65) Prior Publication Data

US 2007/0104919 A1 May 10, 2007

(30) Foreign Application Priority Data

Nov. 10, 2005 (JP) ............................. 2005-326172
Oct. 13, 2006 (JP) ............................. 2006-279961

(51) Int. Cl.
*G11B 7/24* (2006.01)

(52) U.S. Cl. ................. 430/270.12; 430/945; 428/64.4; 369/283

(58) Field of Classification Search ................... None
See application file for complete search history.

(56) References Cited

U.S. PATENT DOCUMENTS

| | | | | |
|---|---|---|---|---|
| 4,379,299 A | * | 4/1983 | Fitzpatrick et al. | 347/224 |
| 4,388,400 A | * | 6/1983 | Tabei et al. | 430/346 |
| 4,433,340 A | * | 2/1984 | Mashita et al. | 346/135.1 |
| 4,647,947 A | * | 3/1987 | Takeoka et al. | 346/135.1 |
| 4,845,000 A | * | 7/1989 | Takeoka et al. | 430/14 |
| 5,635,729 A | * | 6/1997 | Griessen et al. | 257/2 |
| 5,652,433 A | * | 7/1997 | Ouwerkerk et al. | 257/1 |
| 5,843,553 A | * | 12/1998 | Olin et al. | 428/64.1 |
| 6,047,107 A | * | 4/2000 | Roozeboom et al. | 392/416 |
| 6,251,561 B1 | * | 6/2001 | Kawai et al. | 430/270.11 |
| 6,312,780 B1 | * | 11/2001 | Kasami et al. | 428/64.1 |
| 6,437,900 B1 | * | 8/2002 | Cornelissen et al. | 359/246 |
| 2002/0055012 A1 | * | 5/2002 | Chou et al. | 428/688 |
| 2004/0038080 A1 | * | 2/2004 | Inoue et al. | 428/694 SC |
| 2004/0257920 A1 | * | 12/2004 | Takahashi et al. | 369/13.4 |
| 2008/0267048 A1 | * | 10/2008 | Poupinet et al. | 369/275.3 |

FOREIGN PATENT DOCUMENTS

| | | | |
|---|---|---|---|
| JP | 04-030343 | * | 2/1992 |
| JP | 04-095246 | * | 3/1992 |
| JP | 04-134653 | * | 5/1992 |
| JP | 06-060458 | * | 3/1994 |
| WO | 2006/103340 | * | 10/2006 |

* cited by examiner

*Primary Examiner*—Martin J Angebranndt
(74) *Attorney, Agent, or Firm*—Fitzpatrick, Cella, Harper & Scinto

(57) ABSTRACT

A write-once optical disk comprises a substrate, a recording layer which is stacked on the substrate and comprised of a first reaction layer comprised of a material containing hydrogen and a second reaction layer comprised of a material having an extinction coefficient greater than that in the first reaction layer, and a protective layer which is stacked on the recording layer.

5 Claims, 2 Drawing Sheets

WRITE-ONCE OPTICAL DISK AND OPTICAL RECORDING METHOD

BACKGROUND OF THE INVENTION

1. Field of the Invention

The present invention relates to a write-once optical disk which can record and regenerating information by illuminating and heating itself, and to an optical recording method using the same.

2. Description of the Related Art

In recent years, as a moving image is digitized, the requirement of increasing recording density of and giving larger capacity to a recording medium is increasing.

In addition, as a substitute for a magnetic storage medium which has been used conventionally, the optical recording medium has been energetically researched and developed which can possess high recording density without bringing a recording head in contact with the optical recording medium. The optical recording medium includes a read-only type which can only read the information, a write-once type which can only record and regenerating the information, and a rewritable type which can record, regenerating and erase the information. Among them, optical recording media on which a user can record information are the write-once type and the rewritable type.

A rewritable type optical recording medium can not only record and regenerating the information, but also re-record the information after having erased it, and accordingly is suitable for use in repeatedly rewriting the information.

On the other hand, a write-once type optical recording medium can record and regenerating information as needed, but cannot erase and re-record the information. The fact is seemingly considered as a disadvantage, but becomes a characteristic of "prevention of falsification for data", and accordingly has been recognized to be useful for files for distribution, long-period storage, back up or the conservation of an official document.

A write-once optical recording medium includes several types such as CD-R, DVD-R and Photo CD. The medium also includes a type in which a recording layer is composed of an organic coloring material as a main component and the other type in which the recording layer is composed of a metallic element or a non-metallic element as a main component, as known types, and the former is currently a mainstream.

However, an organic material suitable for a laser having a short wavelength has not yet been found, although it is demanded as the density of recorded information increases. Any organic material does not have an optical property equal to a conventional one for a laser with a blue wavelength. This is because although the organic material needs to downsize its molecular skeleton or shorten a conjugating system in order to possess an absorption band around the blue wavelength of the laser, such an organic material then causes the reduction of its absorption coefficient, namely, of its refractive index. In other words, there are many organic materials which have an absorption band around the blue wavelength of the laser and can control the absorption coefficient, but any of them does not have high refractive index and can not provide a high degree of modulation.

For this reason, a write-once type optical recording medium having a recording layer composed of a metallic element as a main component has been variously studied in terms of the design of an inner structure composed of a recording layer and the other layer arranged on the periphery, and of a recording type using the structure. For instance, such methods are known as to open pits in a medium by irradiation with a laser, and as to record information by changing the reflectance of the layer through changing the structure by using a phase change or an alloying technique.

In a pit type recording medium, a study on a medium using a Te film has been progressing. For instance, Japanese Patent Application Laid-Open No. S58-189850 discloses the method of forming an oxide film on the surface of the Te film so as to improve its environment resistance. In addition, a method of adding Se or C to Te similarly to improve the environment resistance is proposed, or a study of a CS2—Te film has been proceeded (for instance, see "Kioku•Kiroku-Gijutsu Handbook (Recording/Storage Technology Handbook)", Maruzen Co., Ltd., Aug. 25, 1992, pp. 543-546). A method of lowering a melting point by alloying Te with Bi, Zn, Cd, In, Sb, Pb and Sn so as to improve the recording sensitivity of the Te film has also been proposed (for instance, Japanese Patent Application Laid-open No. S58-9234).

A proposed representative phase change type includes a type of using a TeOx film or a TeOx—Pd film (for instance, see "Kioku•Kiroku-Gijutsu Handbook (Recording/Storage Technology Handbook)", Maruzen Co., Ltd., Aug. 25, 1992, p. 546), and a bilayer type of using $Bi_2Te_3$ as a reflective layer and $Sb_2Se_3$ as a phase change recording layer (for instance, see "Hikari-Kiroku Gijutsu To Zairyou (Optical Recording Technology And Material)", CMC Publishing Co., Ltd., October 1985, pp. 94-95).

A proposed alloying type includes a type having a recording layer comprising at least two layers of: a layer formed of at least one element selected from the element group consisting of Ge, Si and Sn; and a layer formed of at least one element selected from the element group consisting of Au, Ag, Al and Cu. When a optical recording medium of such an alloying type is used, the recording layer is irradiated with a laser beam, then the bilayer is alloyed, and the alloyed portion is used for recording (for instance, see Japanese Patent Application Laid-open No. H04-226784).

As a method for alloying between a bilayer, a optical recording medium is further proposed which is composed of a first recording layer mainly containing In formed on a substrate, and a second recording layer containing an element selected from the group consisting of elements in Group 5B or 6B in the periodic table placed thereon (for instance, see Japanese Patent Application Laid-open No. H11-34501).

However, the above described pit type medium has difficulty in obtaining uniform pits thereon when recording density has increased. A phase change type medium has a danger of erasing a recording mark in some cases, because of using a phase change between a crystal state and an amorphous state. In addition, an alloying type medium has had a problem that a contrast of a regenerating signal in the recording mark is low. Furthermore, a recording medium of the alloying type has difficulty in increasing the recording density by a multilayered structure because the recording layer containing a metallic element as a main component used in the medium has a low transmittance.

SUMMARY OF THE INVENTION

The present invention is directed at providing an optical disk which has high recording density, superior stability for storing recorded information and superior jitter characteristics, and is suitable for a multilayered structure, and providing an optical recording method using it.

According to an aspect of the present invention, there is provided a write-once optical disk comprising a substrate; a recording layer which is stacked on the substrate and comprised of a first reaction layer comprised of a material containing hydrogen and a second reaction layer comprised of a material having an extinction coefficient greater than that in the first reaction layer; and a protective layer which is stacked on the recording layer.

The first reaction layer is preferably comprised of a dielectric substance comprised of SiN, SiC or $SiO_2$ as a main component.

The second reaction layer preferably ranges in the extinction coefficient from 0.5 to 3.3.

In the write-once optical disk, a first dielectric layer is placed between the substrate and the recording layer, and a second dielectric layer is placed between the recording layer and the protective layer.

In the write-once optical disk, a reflective layer also serving as a heat sink layer is preferably placed in a region on a side of the recording layer opposite a side of the recording layer on which a laser beam is incident.

According to another aspect of the present invention, there is provided a method for recording information on the write-once optical disk comprising the steps of:

irradiating the recoding layer with a laser beam incident on a side of the recording layer which side the substrate or the protective layer exists in a region on; and causing an optical change by making a quantity of hydrogen contained in a region of the first reaction layer irradiated with the laser beam decrease to form a recording mark.

Further features of the present invention will become apparent from the following description of exemplary embodiments with reference to the attached drawings.

DESCRIPTION OF THE EMBODIMENTS

A write-once optical disk according to the present invention is provided at least with a protective layer and a recording layer on a substrate. The recording layer is arranged between the above described substrate and the above described protective layer, and when information is recorded therein, it makes the recording mark therein formed in a region of itself irradiated with the laser beam incident from the substrate side or the protective layer side. The write-once optical disk according to the present invention is characterized in that the recording layer is comprised of at least two layers consisting of the first and second reaction layers, the first reaction layer is comprised of a material containing hydrogen, and the second reaction layer is comprised of a material having an extinction coefficient greater than that in the first reaction layer. In the next place, embodiments of the present invention will be described with reference to the drawings.

First Embodiment

Figure 1:
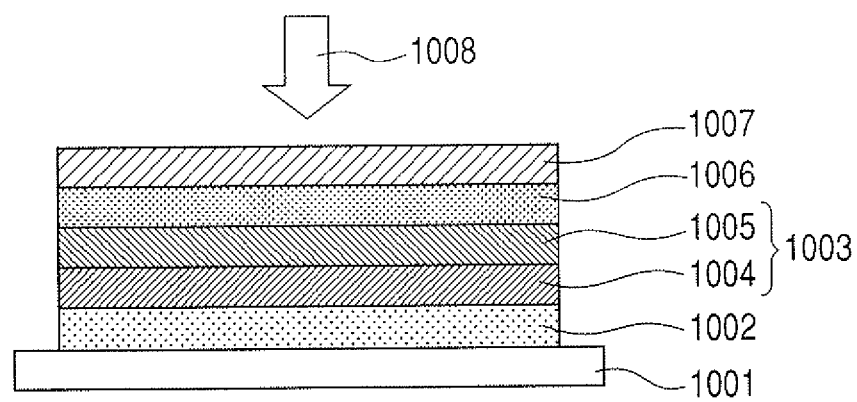
FIG. 1 is a diagrammatic sectional view showing a first embodiment of a write-once optical disk according to the present invention.

FIG. 1 is a diagrammatic sectional view showing one example of a write-once optical disk according to the present invention. The optical disk has a first dielectric layer 1002, a first reaction layer 1004, a second reaction layer 1005, a second dielectric layer 1006 and a protective layer 1007 sequentially layered on one principal surface of a substrate 1001. A recording layer 1003 is composed of the first reaction layer 1004 and the second reaction layer 1005. Laser beam 1008 denotes a state incident thereon from the side which the protective layer 1007 exists in a region on.

A thickness of the substrate 1001 is preferably selected from the thicknesses of 0.3 mm to 1.2 mm, and is 1.1 mm, for instance. A usable material for the substrate 1001 includes, for instance, a plastic material such as a polycarbonate resin, a polyolefin resin and an acrylic resin; and glass. Normally, unevenness sections (not shown) to be a guiding groove for introducing an optical spot when information is recorded or played back are formed on the surface of the substrate 1001, in the side having layers of the first dielectric layer 1002 to the protective layer 1007 to be formed thereon.

The first dielectric layer 1002 and the second dielectric layer 1006 prevent the heat generated in the recording layer 1003 from radiating outside the recording layer 1003 and the recording layer 1003 from being deformed by the heat, when the recording layer 1003 is irradiated with a laser beam having a predetermined output during a recording operation. A component of both dielectric layers is not limited in particular as long as it is a transparent dielectric substance, and is selected from materials having the low ability of absorbing the laser beam for recording and playing back. For instance, the material can employ an oxide, a sulfide, a nitride or a combination of them, for its main component. It is preferably selected from the group consisting of $Al_2O_3$, AlN, ZnO, ZnS, GeN, GeCrN, CeO, SiO, $SiO_2$, SiN and SiC. The material more preferably employs a ZnS—$SiO_2$ mixture having a mol ratio of about 4:1, for the main component. The first dielectric layer 1002 and the second dielectric layer 1006 may be composed of the same component as the other, or may be composed of a different component from the other.

Thicknesses of the first dielectric layer 1002 and the second dielectric layer 1006 are not limited in particular because they have only to be set to determined thicknesses by an optical design, but preferably are 5 to 100 nm. When the thickness is 5 nm or more, it facilitates the formed dielectric layer to have uniform thickness. When the thickness is 100 nm or less, it shortens a film-forming period of time and improves productivity.

The recording layer 1003 has a first reaction layer 1004 and a second reaction layer 1005 adjacent to the first reaction layer, and is located between a substrate 1001 and a protecting layer 1007. The quantity of hydrogen contained in the first reaction layer partly is decreased by heat and the optical property of the part is changed when a laser beam having a predetermined power is incident from the substrate or protective layer side of the disk and the recording layer is irradiated with the laser beam. As a result, a recording mark is formed at the hydrogen-decreased part.

The first reaction layer 1004 constitutes one side of the reaction layer directed to the substrate 1001, while the second reaction layer 1005 constitutes the other side directed to the protective layer 1007. The first reaction layer 1004 is preferably comprised of a dielectric substance comprised of SiN, SiC or $SiO_2$ as a main component and preferably containing hydrogen.

The second reaction layer 1005 is comprised of a material having a greater extinction coefficient than that in the first reaction layer. The greater the extinction coefficient is, the easier the incident laser beam turns into heat. Accordingly, the main function of the second reaction layer 1005 is to provide the heat in aid of a reaction caused in the first reaction layer 1004. The second reaction layer 1005 preferably has the extinction coefficient of 0.5 or more and is preferably comprised of a rare earth metal comprised of Tb or La as a main component; an oxide, a nitride, an oxide nitride or a metal comprised of Si or Al as a main component. The extinction coefficient greatly depends on the kind of metal material used. However, in the oxide, nitride and oxide nitride of the metal material, it is possible to change the coefficient according to the introduced amount oxygen gas or nitrogen gas in the film-forming step. From the viewpoint of obtaining the recording layer 1003 with high transmittance, taking the multi-layering of the optical disk into account, the extinction coefficient of 3.3 or less in the second reaction layer is more preferable.

Further, the combination of SiN and Tb, or SiN and Si is preferable as that of the main components of the first and second reaction layers. In addition, when using a rare earth metal for the second reaction layer 1005. In addition, from the viewpoint of improving the stability to the oxidation or sulfuration in any step other than the recording, Mg, Ti, Cr, Ni, Al, Si, Ga, Ge and so forth besides the element as the main component described above may be added thereto.

Figure 2:
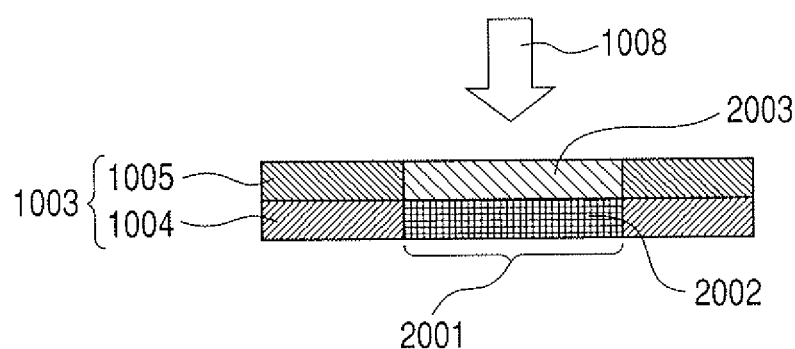
FIG. 2 is a diagrammatic sectional view showing a state of a recording layer after having optically recorded information on a write-once optical disk according to the present invention.

The thickness of the recording layer 1003 is not limited in particular as long as a part of the first reaction layer 1004 irradiated with a laser beam during a recording operation can immediately form a recording mark 2001 comprised of an optical change caused by the decrease of hydrogen (cf. FIG. 2). However, by making the thickness of the recording layer 1003 thin, the recording mark is formed in a shorter period of time, which further facilitates high-speed recording.

A thickness ratio of the first reaction layer 1004 to the second reaction layer 1005 is not also limited in particular. In case that the second reaction layer 1005 is comprised of a metal element selected from the group consisting of Tb, La, Si and Al as a main component, the thickness in the multi-layering preferably ranges from 5 to 10 nm, in view of the transmittance.

The protective layer 1007 is a layer for preventing the second dielectric layer 1006 and the recording layer 1003 from being damaged when the write-once optical disk is used or preserved. On the other hand, the protective layer 1007 is optically transparent, because when information is recorded on the optical disk, the recording layer 1003 needs to be irradiated with a laser beam. Accordingly, a component for the protective layer 1007 is not limited in particular as long as it is optically transparent. For instance, the protective layer 1007 can be formed of an optically transparent sheet consisting of an optically transparent sheet (film) having a planar annular shape and an adhesive layer (both are not illustrated) for bonding the optically transparent sheet to the second dielectric layer 1006.

The adhesive layer is made from, for instance, an ultraviolet-curing resin or a pressure sensitive adhesive.

The optically transparent sheet is preferably made from a material having low absorbing ability to a laser beam used for recording/playing back, and specifically is preferably a material which imparts the optically transparent sheet a transmittance of 90% or higher, such as a polycarbonate resin and a polyolefin resin. The optically transparent sheet is prepared by charging such a material into an extruder; melting it at an extrusion temperature of 250 to 300° C. to extrude; forming it into a sheet shape with the use of a plurality of cooling rollers; and cutting it to a shape matching with the substrate 1001. The thickness of the optically transparent sheet is preferably selected from a range between 3 and 177 μm, and the total thickness of itself and the adhesive layer is preferably 100 μm for instance. High density recording can be realized by combining such a thin protective layer 1007 and an objective lens having a numerical aperture (expressed by NA in some cases) of about 0.85.

In addition, the protective layer 1007 may be formed of an optically transparent cover having a protective layer made from an organic or inorganic material so as to prevent the surface from the deposition of dust thereon or from being damaged. The organic or inorganic material also desirably has a low capacity of absorbing the wavelength of a laser used for record and regenerating.

In the next place, one example of a method for manufacturing the write-once optical disk will be described.

Each layer from the first dielectric layer 1002 to the second dielectric 1006 can be formed on the substrate 1001 by using a vapor-phase growth method with the use of chemical species containing an element composing each layer. Such a vapor-phase growth method includes, for instance, a vacuum deposition method, a sputtering method and a plasma CVD method. Then, the protective layer 1007 is formed on the second dielectric layer 1006.

The protective layer 1007 can be formed by a method of laminating the above describe optically transparent cover onto the second dielectric layer 1006. Other than this method, the protective layer can be formed by a method of dissolving an acrylic or epoxy ultraviolet-curing resin into a solvent to prepare a resin solution, coating it on the second dielectric layer 1006 by a spin-coating technique or the like and drying it to cure it.

Thus, the write-once optical disk can be manufactured. The method for manufacturing the above described write-once optical disk is not limited to the above described method in particular, but can be employed a manufacturing technology which is adopted for manufacturing a well-known optical disk.

In the next place, an optical recording method according to the present invention will be described. The optical recording method is comprised of the steps of irradiating the recording layer of the above write-once optical disk with a laser beam with a prescribed power incident on a side of the recording layer which side the substrate or the protective layer exists in a region on, and causing an optical change of the irradiated region of the first reaction layer comprised in the recording layer by making a quantity of hydrogen contained in the irradiated region decrease to form a recording mark.

An optical recording method according to the present invention has a step of forming a recording mark including a hydride of a rare earth metal in a predetermined region of a recording layer, by irradiating the recording layer with a laser beam which has a predetermined output and is incident on a write-once optical disk from a substrate side or a protective layer side. The optical recording method according to the present invention is characterized in that the above described write-once optical disk is the write-once optical disk according to the present invention.

An embodiment of the optical recording method according to the present invention will be described on an example of using the above described write-once optical disk according to the present invention, and irradiating a protective layer with a laser beam having a predetermined output incident from a side of the protective layer. FIG. 1 is a diagrammatic sectional view showing the first embodiment of the write-once optical disk according to the present invention.

As shown in FIG. 1, the recording layer 1003 of the write-once optical disk is irradiated with a laser beam 1008 having a predetermined output incident from the protective layer 1007 side. The region of the second reaction layer 1005 irradiated with and absorbing the laser beam is heated to a temperature of 300 to 700° C., whereby hydrogen is dissociated/released to form a region 2002 of the first reaction layer wherein hydrogen is dissociated/released, as shown in FIG. 2. In the region, the first reaction layer is converted into a dielectric layer containing little hydrogen. Thus, the recording mark 2001 is formed wherein an optical change has been caused. On the other hand, the region 2003 which contains the hydrogen released from the first reaction layer 1004 is formed in the second reaction layer 1005. In particular, when a rare earth metal such as Tb and La is used for the second reaction layer 1005, the hydride is formed and the extinction coefficient therefore decreases.

In order to examine the change of optical characteristics before and after the recording operation, a sample was prepared on a glass substrate on the same condition as the first reaction layer 1004 was prepared, and was heat-treated in a heating furnace at 250° C. for 1 h. A refractive index before and after the heat treatment for the first reaction layer sample was calculated from the reflectance of the sample layered on the glass substrate. The refractive index of the sample was determined by measuring the reflectances at arbitrary ten points in one sample, and calculating an average value of the refractive indexes each calculated from the reflectance. A spectrophotometer made by JASCO Corporation was used in measuring the reflectance. The obtained results are shown in Table 1.

TABLE 1

| | | Refractive Index | |
|---|---|---|---|
| | | Before heat-treatment | Treated at 250° C. for 1 h |
| First | SiN | 1.7 | 2.0 |
| reaction | SiC | 1.6 | 1.9 |
| layer | SiO$_2$ | 1.7 | 2.0 |

As is shown in Table 1, it is recognized that the refractive index of the first reaction layer sample increases after having been heat-treated under the above described conditions, and it is assumed from this fact that the difference of reflectances between a recorded region and a unrecorded region is sufficiently large, and accordingly a high regenerating signal (C/N ratio) will be obtained in regenerating.

On the other hand, also in the second reaction layer 1005, there is the possibility that the optical property in the irradiated portion with the laser beam changes. For instance, in the case where the second reaction layer 1005 is comprised of a material comprised of a rare earth metal as a main component, a hydride of the rare earth metal is formed by a reaction with hydrogen eliminated from the first reaction layer 1004, rendering the region almost transparent. Accordingly, the difference in transmittance between recorded portions and unrecorded portions is a problem in multi-layering of the recording layer. However, if the second reaction layer is 5 through 10 nm thick, such a thin thickness then restrains the ratio of change, up to a negligible value.

The recording mark 2001 is composed of a dielectric film in the vicinity of a stoichiometric composition formed by the dissociation/release of hydrogen. For this reason, the recording mark has high thermal stability, a wide range of a regenerating power can be applied to the recording mark, and a C/N ratio of a regenerating signal is sufficiently prevented from degrading along with a period of time. Accordingly, the recorded information is effectively prevented from degrading for a long period of time after having been optically recorded. In other words, the C/N ratio of the excellent initial regenerating signal obtained in a recording operation is maintained for a long period of time, and the regenerating signal is sufficiently prevented from degrading along with an elapsing time.

Second Embodiment

Figure 3:
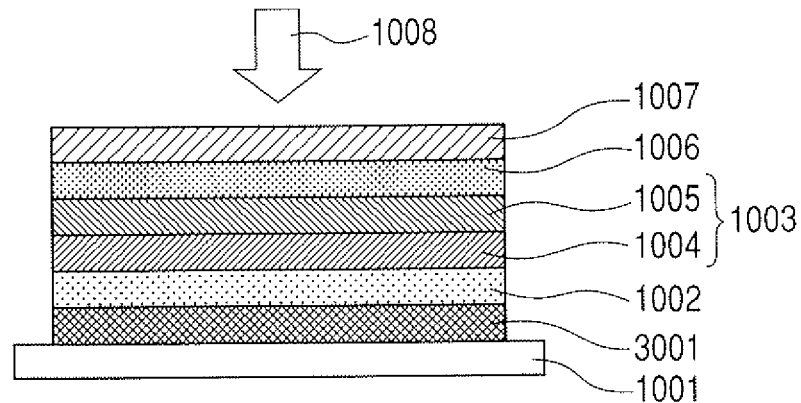
FIG. 3 is a diagrammatic sectional view showing a second embodiment of a write-once optical disk according to the present invention.

FIG. 3 is a diagrammatic sectional view showing a second embodiment of a write-once optical disk according to the present invention. A write-once optical disk according to the second embodiment shown in FIG. 3 has the same configuration as the one shown in FIG. 1, except that a reflective layer 3001 having a higher reflectance to a laser beam than that of the recording layer 1003 is placed between a substrate 1001 and a first dielectric layer 1002.

When the reflective layer 3001 is placed between them, the optical disk can more easily obtain a higher regenerating signal (C/N ratio) when a regenerating light is incident on the recording layer 1003 after an optical recording operation, due to a multiple interaction effect. A material composing the reflective layer 3001 is not limited in particular as long as it gives the reflective layer 3001 a higher reflectance to a laser beam than that of the recording layer 1003. A preferred composing material can include, for instance, Mg, Al, Ti, Cr, Fe, Co, Ni, Cu, Zn, Ge, Ag, Pt and Au. Among them, a more preferred material is a metallic material such as Al, Au, Ag, Cu or an alloy thereof (for instance, alloys of Al with Ta Ti, Cr and Si), because the metallic material has high reflectance. The reflective layer 3001 preferably has a thickness selected from a range normally between 80 nm or more and 140 nm or less, and is 100 nm for instance. When the reflective layer 3001 has the thickness of 80 nm or more, it can make generated heat in the recording layer 1003 quickly radiated and make the recording layer 1003 easily cooled, and can inhibit jitter characteristics from degrading due to a regenerating power in a regenerating operation. On the other hand, when the thickness of the reflective layer 3001 is controlled to 140 nm or less, the difference of the thickness among positions in the reflective layer does not cause difference in thermal characteristics and optical characteristics, which is preferable from a practical standpoint. The reflective layer 3001 can be formed by a vapor-phase growth method using chemical species containing an element composing the reflective layer 3001, as in the case of the other layers in the first embodiment for instance.

An optical recording method using the write-once optical disk according to the second embodiment can be performed in the same manner as in the first embodiment. However, the write-once optical disk can more easily obtain a higher regenerating signal (C/N ratio) when a regenerating light is incident on the recording layer after an optical recording operation, due to a multiple interaction effect originating in the reflective layer 3001.

Third Embodiment

Figure 4:
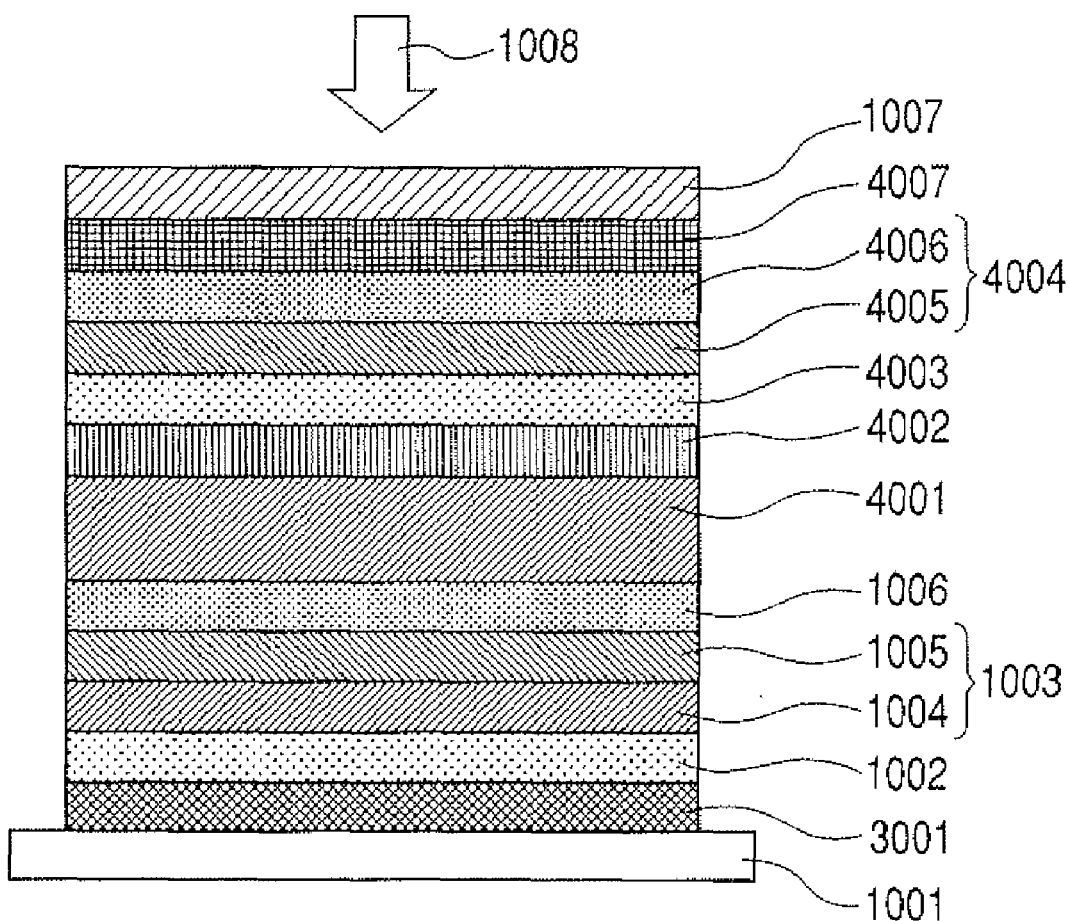
FIG. 4 is a diagrammatic sectional view showing a third embodiment of a write-once optical disk according to the present invention.

FIG. 4 is a diagrammatic sectional view showing a third embodiment of a write-once optical disk according to the present invention. The write-once optical disk according to the embodiment shown in FIG. 4 is an optical disk of a dual layer configuration, which has another recording layer (second recording layer 4004) between a second dielectric layer 1006 and a protective layer 1007. The second recording layer 4004 consists of a third reaction layer 4005 and a fourth reaction layer 4006. In FIG. 4, the configuration from a substrate 1001 to the second dielectric layer 1006 is the same configuration as in the second embodiment. The configuration in FIG. 4 has an intermediate layer 4001 placed on the second dielectric layer 1006. The intermediate layer 4001 can be formed by dissolving an acrylic or epoxy ultraviolet-light curing resin into a solvent to prepare a resin solution; and applying it on the second dielectric layer with a spin coat method or the like. The intermediate layer 4001 has unevenness sections (not shown) to be a guiding groove for introducing an optical spot when information is recorded or played back formed one principal surface in the side having each layer (second reflective layer 4002 to fourth dielectric layer 4007) to be formed thereon. The unevenness sections can be formed, for instance, by forming a layer of an ultraviolet-light curing resin on the second dielectric layer; and forming the pattern with a 2P method (photo-polymerization method). The thickness of the intermediate layer 4001 has only to be determined into a desired value according to the total number of recording layers, and is not limited in particular. However, the thickness is preferably selected from a range normally of 10 μm or more to 40 μm or less in the case of the write-once optical disk of the dual layer configuration according to the present embodiment, and is 25 μm for instance. The second reflective layer 4002, the third dielectric layer 4003 comprised of the third and fourth reaction layers, the second recording layer 4004 and the fourth dielectric layer 4007 to be formed on the intermediate layer 4001 may be formed from the same materials as the reflective layer 3001 to the second dielectric layer 1006 according to the second embodiment. The thicknesses of the respective layers are not limited in particular, because they are selected from desired values determined by an optical design.

As described above, the present invention has been described with reference to preferred embodiments as examples, but the present invention is not limited to the above described first to third embodiments. For instance, in the above described first to third embodiments, the first reaction layer 1004 in the recording layer 1003 is arranged in the substrate 1001 side and the second reaction layer 1005 is arranged in the protective layer 1007 side. The arrangement in these embodiments may be changed, for instance, into a configuration in which a position of the first reaction layer 1004 is replaced with that of the second reaction layer 1005. In addition, those embodiments describe the case of making the laser beam 1008 incident from the protective layer 1007 side and irradiate the recording layer 1003 (and the second recording layer 4004) in recording and regenerating operations, but the configuration is also acceptable in which the laser beam is incident from the substrate 1001 side and irradiates the recording layer 1003 (and the second recording layer 4004). In this case, the substrate 1001 has only to be optically transparent, and is not limited in particular. In addition, those embodiments have described the write-once optical disk having a configuration of placing the recording layer between the first dielectric layer and the second dielectric layer (and between the third dielectric layer and the fourth dielectric layer), but the write-once optical disk may have a configuration having no dielectric layer. The write-once optical disk may also have a configuration having only one dielectric layer arranged between the protective layer and the recording layer, or the substrate and the recording layer. In addition, those embodiments have described the write-once optical disk having the recording layer made of the dual-layer structure, but the write-once optical disk may have a recording layer composed of two or more layers as long as the recording layer has at least one first reaction layer and at least one second reaction layer contacting with it. For instance, the write-once optical disk may have a recording layer formed of a ternary-layer structure consisting of two first reaction layers and a second reaction layer arranged between the two first reaction layers. In addition, the third embodiment has described the write-once optical disk having the dual-layer configuration, but the write-once optical disk may have a multilayered structure consisting of three or more recording layers.

EXAMPLES

In the next place, the present invention will be described in more detail with reference to examples, but the present invention is not limited to the following examples unless deviating from the purpose.

Example 1

A write-once optical disk was prepared so as to have a first dielectric layer, a first reaction layer, a second reaction layer, a second dielectric layer and a protective layer sequentially formed on a substrate, by using a combination apparatus of a plasma CVD apparatus having direct current, RF and microwave power sources and a magnetron sputtering apparatus. A polycarbonate substrate with a diameter of 120 mm and a thickness of 1.1 mm was used as the substrate. A guiding groove (groove and land) for tracking having a track pitch (width between repeated unevennesses) of 0.32 μm is formed on one principal surface of the substrate in a side on which a recording layer would be formed.

The above described substrate was fixed on a substrate holder, and then the inside of a chamber was evacuated into a high vacuum of $2 \times 10^{-5}$ Pa or lower with a cryopump. Subsequently, Ar gas and $O_2$ gas were first sent into the chamber while the inside was being evacuated, and the pressure was adjusted into 0.3 Pa through conductance adjustment. The first dielectric layer was formed into the film thickness of 50 nm on the substrate with a sputtering technique under conditions of the substrate rotation speed of 100 rpm, the power density charged into a target of 1.59 W/cm$^2$, 100 sccm for Ar gas and 1 sccm for $O_2$ gas. The first dielectric layer was the layer formed of a ZnS—SiO2 mixture containing 20 mol % $SiO_2$. A ZnS target containing 20 mol % $SiO_2$ was used as the target.

Then, the substrate was transported into another chamber, $SiH_4$ gas and $N_2$ gas were introduced therein, and the first reaction layer 1004 was formed with the use of a microwave plasma CVD method. The $SiH_4$ gas and $N_2$ gas were sent into the chamber, and the pressure was adjusted to 4 Pa by conductance adjustment. A hydrogen-containing SiN layer was formed into the thickness of 25 nm while the substrate was rotated, as the first reaction layer 1004. A content of hydrogen in the first reaction layer 1004 was determined by preparing a sample having the hydrogen-containing SiN layer formed on a glass substrate on the same film-forming condition as described above, and measuring the content of hydrogen in the sample with a second ion mass spectrometry instrument (SIMS). The first reaction layer 1004 contained hydrogen in an amount of $2.1 \times 10^{22}$ atoms/cm$^3$. In addition, membrane stress was measured by preparing a substrate having the hydrogen-containing SiN layer formed on a glass disk for stress measurement with the diameter of 30 mm and the thickness of 1.0 mm in precisely the same film-forming conditions as described above, and detecting the deformation of the substrate by counting the number of Newton rings with the use of an interferometer. Here, when the number of Newton rings is (m), a curvature radius γ of the substrate can be determined by the following expression (1).

$$\gamma = a^2/m\lambda \quad (1)$$

a: radius of substrate, λ: wavelength of light source used in interferometer

Stress σ of the hydrogen-containing SiN film is determined by substituting a value of γ for the following expression (2).

$$\sigma = Eb^2/6(1-\nu)\gamma d \quad (2)$$

E: Young's modulus of substrate, ν: Poisson ratio of substrate, γ: curvature radius of substrate, d: thickness of SiN film, b: substrate thickness As a result of the measurement, the second reaction layer had a membrane stress of $-1.0 \text{ kg/mm}^2$ (in compressive stress state).

Film-forming conditions in a plasma CVD apparatus are described below.

(1) sort of gas: $SiH_4$ and $N_2$
(2) gas pressure: 4 to 13 Pa
(3) flow rate: 200 sccm for $SiH_4$ and 500 sccm for $N_2$
(4) charged power: 1.5 kw In the above description, "sccm" means "standard cc/min", and specifically "1 sccm" means that a gas with a pressure of $10^{13}$ hPa and with a temperature of 0° C. passes at a rate of 1 $cm^3$ per minute.

Then, the substrate was transported to another chamber, Ar gas was sent thereto, and the pressure was adjusted to 0.6 Pa by conductance adjustment. A Tb layer with the film thickness of 5 nm as the second reaction layer 1005 was formed on the substrate with a sputtering technique under conditions of the substrate rotation speed of 50 rpm, the power density charged into a target of 3.79 $W/cm^2$. An addition of $O_2$ gas or $N_2$ gas to the system when the film of the second reaction layer is formed induces the oxidation or nitration, which affects the property of hydrogenation. The second reaction layer was thus formed in another chamber than chambers for forming the other layers. The extinction coefficient of the Tb layer used for the second reaction layer was determined in a manner of measuring that of a Tb film formed on a silicon wafer under the same condition as described above by a spectroellipsometer. As a result, the extinction coefficient of the Tb film of the second reaction layer used for the present Example was 3.0.

Then, the substrate was transported to another chamber, Ar gas and $O_2$ gas were sent into a chamber, and the pressure was adjusted to 0.3 Pa by conductance adjustment. The second dielectric layer with the film thickness of 45 nm was formed on the substrate with a sputtering technique under conditions of the substrate rotation speed of 100 rpm, the power density charged into a target of 1.59 $W/cm^2$, 100 sccm for Ar gas and 1 sccm for $O_2$ gas. The second dielectric layer was a layer formed of a Zns—$SiO_2$ mixture containing 20 mol % $SiO_2$. A ZnS target containing 20 mol % $SiO_2$ was used as the target.

After each layer was formed in the above described manner, the substrate was taken out from a combination apparatus of a plasma CVD apparatus provided with direct current, RF and microwave power sources and a magnetron sputtering apparatus, and an optically transparent cover was layered as the protective layer on the second dielectric layer to complete the write-once optical disk. The optically transparent cover was prepared by previously uniformly applying a pressure sensitive adhesive (PSA) onto one principal surface of an optically transparent sheet with the thickness of 80 μm and with a planar annular shape having a central hole with the diameter of 22 mm and having the outer diameter of 120 mm to form an adhesive layer with a thickness of 20 μm. Next, recording information was recorded and played back on general conditions by using LM330A (trade name) made by Shibasoku Corporation, emitting light toward the above described write-once optical disk according to the present embodiment prepared as described above, from the optically transparent cover side, making an objective lens condense the emitted light, and irradiating the recording layer with the light. In the above operation, a wavelength λ of the emitted light was 405 nm, the NA of the objective lens was 0.85, linear velocity was 4.917 m/s and a random signal with a bit length of 111.75 nm in RLL modulation (1-7) was used as a recording signal. As a result, the optical disk showed an adequate jitter (σ/T) value of 8.0%. In addition, after the optical disk had been subjected to a durability test for 1,000 hours in H/H environment (80° C./90%), it showed a jitter (σ/T) value of 8.5%, which meant that the jitter value was not particularly greatly deteriorated.

Example 2

A write-once optical disk was prepared as in the case of Example 1 except that a SiC layer containing hydrogen was formed as a first reaction layer 1004 on the following conditions, and was evaluated as in the case of Example 1.

A hydrogen content in the first reaction layer was $3.0 \times 10^{22}$ atoms/$cm^3$ and membrane stress was $-1.5 \text{ kg/mm}^2$ (in compressive stress state).

The film-forming conditions in a plasma CVD apparatus are described below.

(1) sort of gas: $SiH_4$ and $C_2H_2$
(2) gas pressure: 4 to 13 Pa
(3) flow rate: 200 sccm for $SiH_4$ and 200 sccm for $C_2H_2$
(4) charged power: 1.5 kw The write-once optical disk according to the present Example showed an adequate jitter (σ/T) value of 9.0%. In addition, after the optical disk had been subjected to a durability test for 1,000 hours in H/H environment (80° C./90%), it showed a jitter (σ/T) value of 9.8%, which meant that the jitter value was not particularly greatly deteriorated.

Example 3

A write-once optical disk was prepared as in the case of Example 1 except that a $SiO_2$ layer containing hydrogen was formed as a first reaction layer 1004 on the following conditions, and was evaluated as in the case of Example 1.

A hydrogen content in the first reaction layer 1004 was $2.6 \times 10^{22}$ atoms/$cm^3$ and membrane stress was $-0.5 \text{ kg/mm}^2$ (in compressive stress state).

The film-forming conditions in a plasma CVD apparatus are described below.

(1) sort of gas: $SiH_4$ and $O_2$
(2) gas pressure: 4 to 13 Pa
(3) flow rate: 200 sccm for $SiH_4$ and 500 sccm for $O_2$
(4) charged power: 1.5 kw The optical disk according to the present Example showed an adequate jitter (σ/T) value of 8.5%. In addition, after the optical disk had been subjected to a durability test for 1,000 hours in H/H environment (80° C./90%), it showed a jitter (σ/T) value of 9.1%, which meant that the jitter value was not particularly greatly deteriorated.

Example 4

A reflective layer made from an Ag alloy with the thickness of 80 nm (Ag alloy containing less than 1 mol % of Au, Pt, Pd, In, Nd and Y) was placed between a substrate and a first dielectric layer with a sputtering technique. Subsequently, a write-once optical disk was completed as in the case of Example 1 except that the thickness of the first dielectric layer was controlled to 10 nm, and was evaluated as in the case of Example 1.

The write-once optical disk according to the present Example showed an adequate jitter ($\sigma/T$) value of 7.0%. In addition, after the optical disk had been subjected to a durability test for 1,000 hours in H/H environment (80° C./90%), it showed a jitter ($\sigma/T$) value of 7.7%, which meant that the jitter value was not particularly greatly deteriorated.

Example 5

A write-once optical disk was prepared as in the case of Example 4 except that a La layer was formed as a second reaction layer 1005, and was evaluated. The film-forming of the second reaction layer was carried out by introducing Ar gas and adjusting the pressure to 0.6 Pa by conductance adjustment. The condition for the sputtering technique was comprised of the substrate rotation speed of 50 rpm and the power density charged into a target of 3.79 W/cm². The extinction coefficient of the La layer used for the second reaction layer of the present Example was 3.3.

The write-once optical disk according to the present Example showed an adequate jitter ($\sigma/T$) value of 7.0%. In addition, after the optical disk had been subjected to a durability test for 1,000 hours in H/H environment (80° C./90%), it showed a jitter ($\sigma/T$) value of 7.8%, which meant that the jitter value was not particularly greatly deteriorated.

Example 6

A write-once optical disk was prepared and evaluated in the same manner as in Example 1 except that a Si layer was formed as a second reaction 1005 layer. The film-forming of the second reaction layer was carried out by introducing Ar gas and adjusting the pressure to 0.25 Pa by conductance adjustment. The condition for the sputtering technique was comprised of the substrate rotation speed of 50 rpm and the power density charged into a target of 3.28 W/cm². The extinction coefficient of the Si layer used for the second reaction layer was 1.9.

The write-once optical disk according to the present Example showed an adequate jitter ($\sigma/T$) value of 6.8%. In addition, after the optical disk had been subjected to a durability test for 1,000 hours in H/H environment (80° C./90%), it showed a jitter ($\sigma/T$) value of 7.5%, which meant that the jitter value was not particularly greatly deteriorated.

Example 7

A write-once optical disk was prepared and evaluated in the same manner as in Example 1 except that a SiON layer was formed as a second reaction 1005 layer. The film-forming of the second reaction layer was carried out by introducing Ar gas, $N_2$ gas and $O_2$ gas and adjusting the pressure to 0.25 Pa by conductance adjustment. The condition for the sputtering technique was comprised of the substrate rotation speed of 50 rpm and the power density charged into a target of 3.28 W/cm². The extinction coefficient of the SiON layer used for the second reaction layer of the present invention was 0.5.

The write-once optical disk according to the present Example showed an adequate jitter ($\sigma/T$) value of 7.0%. In addition, after the optical disk had been subjected to a durability test for 1,000 hours in H/H environment (80° C./90%), it showed a jitter ($\sigma/T$) value of 7.9%, which meant that the jitter value was not particularly greatly deteriorated.

Example 8

A write-once optical disk was prepared as in the case of Example 5 except that an intermediate layer, a second reflective layer, a third dielectric layer, a second recording layer consisting of a third reaction layer and a fourth reaction layer and a fourth dielectric layer were each placed in this order between the second dielectric layer and the protective layer, and was evaluated as in the case of Example 5. The above described each layer was produced in the following way.

The intermediate layer was formed into the thickness of 25 µm by dissolving an epoxy ultraviolet-light curing resin in a solvent to prepare a resin solution; and applying it on a second dielectric layer with a spin coat method or the like. A guide groove for tracking with a track pitch of 320 µm was formed on a principal surface in a second reflective layer side of the intermediate layer 4001 by using an ultraviolet-light curing resin and a 2P method (photo-polymerization method).

After the above described intermediate layer was formed on the disk, the disk was returned into a film-forming apparatus again, and the inside of the chamber was evacuated into a high vacuum of $2\times10^{-5}$ Pa or lower with a cryopump. Subsequently, a layer of an Ag alloy (Ag alloy containing less than 1 mol % of Au, Pt, Pd, In, Nd and Y) was formed into the thickness of 10 nm on the intermediate layer as the second reflective layer with a sputtering technique, while the disk was rotated. Subsequently, Ar gas and $O_2$ gas were sent into the chamber, and the pressure was adjusted to 0.3 Pa by conductance adjustment. The third dielectric layer with the thickness of 30 nm was formed on the second reflective layer with a sputtering technique under conditions of the substrate rotation speed of 100 rpm, the power density charged into a target of 1.59 W/cm², 100 sccm for Ar gas and 1 sccm for $O_2$ gas. The third dielectric layer was a layer formed of a Zns—$SiO_2$ mixture containing 20 mol % $SiO_2$. A ZnS target containing 20 mol % $SiO_2$ was used as the target.

Subsequently, the disk was transported to another chamber, the $SiH_4$ gas, and $N_2$ gas were sent into the chamber, and the pressure was adjusted to 4 Pa by conductance adjustment. A hydrogen-containing SiN layer was formed into the thickness of 25 nm as the third reaction layer with a plasma CVD method, while the disk was rotated. A hydrogen content of the obtained fourth reaction layer was measured with the method according to Example 1. The fourth reaction layer contained hydrogen in an amount of $2.1\times10^{22}$ atoms/cm³.

Film-forming conditions in a plasma CVD apparatus are described below.

(1) sort of gas: $SiH_4$ and $N_2$
(2) gas pressure: 4 to 13 Pa
(3) flow rate: 200 sccm for $SiH_4$ and 500 sccm for $N_2$
(4) charged power: 1.5 kw Then, the substrate was transported to another chamber, Ar gas was sent thereto, and the pressure was adjusted to 0.6 Pa by conductance adjustment. A Tb layer with the film thickness of 5 nm as the forth reaction layer was formed on the third reaction layer with a sputtering technique under conditions of the substrate rotation speed of 50 rpm and the power density charged into a target of 3.79 W/cm². The extinction coefficient of the layer was 3.0, which is the same as in Example 1. Then, the disk was transported to another chamber, Ar gas and $O_2$ gas were sent into the chamber, and the pressure was adjusted to 0.3 Pa by conductance adjustment. The fourth dielectric layer with the film thickness of 45 nm was formed on the fourth reaction layer with a sputtering technique under conditions of the substrate rotation speed of 100 rpm, the power density charged into a target of 1.59 W/cm$^2$, 100 sccm for Ar gas and 1 sccm for $O_2$ gas. The fourth dielectric layer was a layer formed of a ZnS—SiO$_2$ mixture containing 20 mol % SiO$_2$.

The write-one optical disk according to the present Example showed adequate results of jitter (σ/T) values of 7.0% in a recording layer arranged in a substrate side, and of 8.5% in a second recording layer arranged in a protective layer side. In addition, after the optical disk had been subjected to a durability test for 1,000 hours in H/H environment (80° C./90%), it showed jitter (σ/T) values of 7.8% in the recording layer arranged in the substrate side, and of 9.4% in the second recording layer arranged in the protective layer side. As described above, the jitter value in any recording layer was not particularly greatly deteriorated.

Comparative Example 1

A write-once optical disk was prepared and evaluated in the same manner as in Example 7 except that a SiON layer was formed as the second reaction layer 1005 under the different condition from that of the Example. The film-forming of the second reaction layer was carried out by introducing Ar gas, $N_2$ gas and $O_2$ gas and adjusting the pressure to 0.25 Pa by conductance adjustment. The film-forming was carried out by changing or increasing their respective relative flow rates of $N_2$ gas and $O_2$ gas to the total flow rate of Ar, $N_2$ and $O_2$ gases. The condition for the sputtering technique was comprised of the substrate rotation speed of 50 rpm and the power density charged into a target of 3.28 W/cm$^2$. The extinction coefficient of the SiON layer used for the second reaction layer of the present Comparative Example was 0.3. The write-once optical disk according to the present Comparative Example showed an inferior sensitivity to the recording power. That is, the jitter value (σ/T) was 16.7% but any saturated jitter value was not obtained even in the recording with the peak power of 15.0 mW. The optical disk was not subjected to a durability test for 1,000 hours in H/H environment (80° C./90%), accordingly.

Comparative Example 2

A write-once optical disk was prepared and evaluated in the same manner as in Example 8 except that a NiCr layer of 3 nm thickness was formed as the fourth recoding layer 4006. In the film-forming of the fourth recording layer 4006, the composition was adjusted by controlling the power to be charged into each of Ni and Cr targets in a binary simultaneous sputtering using the two kinds of targets. The power densities charged into the Ni and Cr targets were 2.17 W/cm$^2$ and 3.28 W/cm$^2$, respectively. As a result, the composition regarding the fourth recording layer of the present Comparative Example was Ni$_{40}$Cr$_{60}$ at %. With respect to the pressure, Ar gas was introduced and the pressure was adjusted to the pressure to 0.5 Pa by conductance adjustment. The condition for the sputtering technique was further comprised of the substrate rotation speed of 50 rpm. The extinction coefficient of the NiCr layer used for the fourth recording layer 4006 of the present Comparative Example was 3.5. Further, the fourth recording layer 4006 having a thickness of 3 nm was thinner than the layer in Example 8 having a thickness of 5 nm, which can compensates the decrease of transmittance caused by the increase of extinction coefficient. Thereby the recording layer for the two-layers medium could be prepared, where the transmittance of the film located in a region on the protective layer side of the second recording layer was 50%. In the write-once optical disk according to the present Comparative Example, while the recording layer located in the substrate side had a jitter (σ/T) value of 7.0%, the second recording layer located in the protective layer side showed an inferior sensitivity to the recording power. That is, the jitter value (σ/T) was 18.4% but any saturated jitter value was not obtained even in the recording with the peak power of 15.0 mW. The optical disk was not subjected to a durability test for 1,000 hours in H/H environment (80° C./90%), accordingly.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2005-326172 filed Nov. 10, 2005 and 2006-279961 filed Oct. 13, 2006, which are hereby incorporated by reference herein in their entirety.

What is claimed is:

1. A write-once optical disk consisting essentially of;
   a disk substrate;
   a recording layer which is stacked on the substrate and comprised of a first reaction layer comprised of a material containing hydrogen and a second reaction layer consisting essentially of a rare earth metal which reacts with the hydrogen to form a hydride in areas heated using a laser; and
   a protective layer which is stacked on the recording layer.

2. The write-once optical disk according to claim 1, wherein the first reaction layer is comprised of a dielectric substance comprised of SiN, SiC or SiO$_2$ as a main component.

3. The write-once optical disk according to claim 2, wherein the rare earth metal comprises as a main component Tb or La.

4. The write-once optical disk according to claim 1, wherein a first dielectric layer is placed between the substrate and the recording layer, and a second dielectric layer is placed between the recording layer and the protective layer.

5. The write-once optical disk according to claim 1, wherein a reflective layer also serving as a heat sink layer is placed in a region on a side of the recording layer opposite a side of the recording layer on which a laser beam is incident.

* * * * *